United States Patent
Keiper et al.

(10) Patent No.: US 6,242,819 B1
(45) Date of Patent: Jun. 5, 2001

(54) GAS EXPANSION TURBINE FOR LOW POWER OUTPUT

(75) Inventors: Rudolf Keiper, Darmstadt; Thomas Müller, Einhausen; Theo Heintz, Frankenthal, all of (DE)

(73) Assignee: Aktiengesellschaft Kühnle, Kopp & Kausch, Frankenthal (DE)

( * ) Notice: Subject to any disclaimer, the term of this patent is extended or adjusted under 35 U.S.C. 154(b) by 0 days.

(21) Appl. No.: 09/327,639

(22) Filed: Jun. 8, 1999

Related U.S. Application Data

(63) Continuation-in-part of application No. PCT/EP98/03432, filed on Jun. 8, 1998.

(30) Foreign Application Priority Data

Aug. 10, 1997 (DE) .............................................. 197 24 460

(51) Int. Cl.$^7$ .............................. F01D 15/10; F02C 6/00; H02K 7/18; H02P 9/04
(52) U.S. Cl. ........................... 290/52; 290/1 A; 290/1 B; 290/1 R; 290/43; 290/54
(58) Field of Search ................................... 290/1 A, 1 R, 290/1 B, 2, 52, 43, 54, 39.51; 60/605.1

(56) References Cited

U.S. PATENT DOCUMENTS

| | | | |
|---|---|---|---|
| 3,773,462 | * 11/1973 | Waeselynck | 60/39 |
| 3,895,488 | * 7/1975 | Koch | 60/39 |
| 4,372,113 | 2/1983 | Ramer | 60/39 |
| 5,314,076 | * 5/1994 | La Place et al. | 210/205 |
| 5,419,112 | * 5/1995 | Farrell | 60/39.15 |
| 5,525,238 | * 6/1996 | Menke | 210/703 |
| 5,559,379 | * 9/1996 | Voss | 310/63 |

FOREIGN PATENT DOCUMENTS

| | | | |
|---|---|---|---|
| 0 004 398 | 10/1979 | (EP) | 60/39 |
| 1 557 943 | 12/1979 | (GB) | 60/39 |
| 2 084 653 | 3/1981 | (GB) | 60/39 |
| 8-121699 | 5/1996 | (JP) | 60/39 |

* cited by examiner

Primary Examiner—Elvin Enad
(74) Attorney, Agent, or Firm—Klaus J. Bach

(57) ABSTRACT

In a gas supply pipe section, an asynchronous motor generator unit is provided in a pipe section consisting of a single supply pipe upstream (at the high pressure side) and adjacent to a separating wall including nozzles for the decompression of the gas. The motor/generator unit includes a shaft which carries downstream (at the low pressure side) of a separating wall adjacent the nozzles at least one bladed turbine wheel which is of lightweight design and is driven by the gas flow. Means are provided for conducting away the electric energy generated during generator operation of the asynchronous motor and for feeding it into an energy supply net. Also, a control unit is provided which supplies a control signal to a safety valve disposed upstream of the asynchronous motor/generator unit for controlling the gas supply to the pipe section when the speed of the shaft exceeds a critical speed value.

3 Claims, 2 Drawing Sheets

GAS EXPANSION TURBINE FOR LOW POWER OUTPUT

This is a Continuation-In-Part application of International Application PCT/EP98/03432 filed Jun. 8, 1998, and claiming priority of German Application 197 24 460.2 filed Jun. 10, 1997.

BACKGROUND OF THE INVENTION

The present invention relates to an arrangement for a gas urbine for use in gas supply pipe systems particularly in long distance gas transmission lines for supplying gas to low pressure end consumers.

In today's long distance gas piping systems particularly natural gas is conducted over long distances of over thousand kilometers to the end consumer for domestic or industrial heating purposes. In order to be able to transport the gas over such long distances at the least possible losses, it is highly compressed to typically 80 bar and above. In order to feed the gas into the low pressure duct systems of the end consumer with substantially lower safety provisions, the gas pressure must be reduced possibly in several expansion stages arranged in series.

In each expansion stage, a part of the energy stored in the compressed gas is released. For economical reasons, it has not been particularly attractive to try to regain the energy released in the final expansion stages in the long distance piping system between local centers (for example, community gas plants) and the final end users (for example, private gas heating systems for domestic use) and to utilize it, (for example, to generate electricity). The reason for omitting such utilization resides in the high investment and maintenance costs for present gas turbine generators including the necessary safety systems which are not in an economically reasonable relation to the advantages that can be obtained by such local electrical power generation.

EP 000 438 discloses a gas expansion turbine in a gas supply system including a motor generator with a shaft provided with a bladed-turbine wheel.

It is the object of the present invention to provide a turbine plant which is simple, compact, and adequate from a safety and from an economical point of view for decompressing the gas at the end stages of long distance gas transmission lines whereby the energy released by the gas expansion can be converted to electrical energy.

SUMMARY OF THE INVENTION

In accordance with the invention, a gas expansion turbine is provided in a gas distribution piping system which includes a gas supply pipe section with at least one separating wall disposed at the supply (high pressure) side. At or near this at least one separating wall which includes nozzles for the depressurization of the gas supplied thereto an asynchronous motor or an asynchronous generator is disposed. The shaft of the asynchronous motor/generator carries at the downstream side (low pressure side) behind the nozzles a turbine wheel which is light-weight and is driven by the gas flow. Furthermore, means are provided for conducting away the electrical energy generated during operation of the generator and for feeding it into the electric power net. Furthermore, a control arrangement is provided which provides a control signal to a safety valve arranged upstream ahead of the asynchronous motor/generator for (partially) closing the gas supply pipe section when the shaft speed exceeds a critical value.

With the arrangement according to the invention, a number of components otherwise needed with gas turbine generators such as a valve housing, a turbine housing and a steam discharge cover are omitted, so that there are no investment and maintenance expenses for these components.

Furthermore, the turbine wheel, which is light-weight particularly by the use of plastic instead of steel as the construction material, provides for an essentially explosion-proof design even without the use of thick-walled housings for the relatively thin-walled standard low pressure pipes. With the relatively light turbine wheel blades used in accordance with the invention, any parts which might fly off at high speeds because of material fatigue as a result of long term use because of crack formations at the rotating blades and which hit the surrounding low pressure pipe walls are retained by the pipe walls because of the relatively low mass and high elasticity of the materials used and the low kinetic energy and low impulse transmission of the parts thrown off.

Furthermore, with the arrangement of a gas decompression turbine according to the invention, the shaft supported in the separating wall does not require a special gas-tight seal which also saves investment and maintenance expenses.

In order to provide for an automatic shut down or respectively, a reduction of the gas flow when the speed of the asynchronous motor/generator becomes excessive because of a break down of the electric power net, a speed-dependent control signal may be supplied to a control device such as a local SPC (storage programmable control) which supplies a control signal to a safety valve disposed upstream of asynchronous motor/generator for (partially) closing the gas supply pipe section. For this purpose, valves can be used which are provided in the various gas supply pipe sections anyhow so that again there are no additional investment and maintenance costs.

The SPC already mentioned can additionally be used for the permanent surveillance of the asynchronous motor/generator speed during start up and also during generator operation.

Since the asynchronous motor/generator is disposed directly in the gas supply flow, there is also no need for the installation of a fan wheel since the asynchronous motor/generator is sufficiently cooled by the gas flow.

Any heat losses caused by mechanical friction in the asynchronous motor/generator and the losses in the copper and iron of the coils of the asynchronous motor/generator are utilized for preheating the gas flow. This will result in an increase of the thermodynamic efficiency during expansion of the gases in the nozzles to the low pressure side pressures and temperatures.

In asynchronous motor/generators with a second free shaft end (as they are provided in series for example for mounting a cooling fan wheel for other applications), it is possible, in a simple manner, to provide for a two-stage expansion for accommodating larger pressure drops by providing on the shaft two impeller wheels in series. In this case, an additional separation wall is disposed in front of the second impeller wheel, which also includes nozzles for the expansion of the gas. In such an arrangement, the gas is subjected to a pre-expansion in the nozzles of the first separating wall, is then conducted onto the first impeller wheel. Subsequently, the gas is directed onto the second impeller wheel (in a second expansion stage) in the same way as it is directed onto the first impeller wheel.

It is of course also possible to arrange several gasexpansion turbines in series in a gas pipe section.

Furthermore, it is possible in a cost-efficient manner to provide for pre-heating of the gas at the supply side for increasing the efficiency.

In order to increase the operational safety of the arrangement according to the invention, in a preferred embodiment, a reinforcement ring is disposed at the inner circumference of the gas supply pipe in the area of the turbine wheel. The distance between the inside wall of the reinforcement ring and the outer circumference of the turbine wheel is so selected that, at speeds below a predetermined speed, the turbine wheel is freely movable within the reinforcement ring. However, upon exceeding the predetermined speed, the turbine wheel comes into contact with the reinforcement ring because of a radial stretching of the blades caused by the centrifugal forces.

If in this preferred arrangement, the asynchronous motor/generator speed becomes excessive because of a failure of the electric power net, that is, if the speed increases in an uncontrolled manner, the blades of the turbine wheels are radially stretched, particularly if they consist of an easily stretchable material such as plastic, until they come into contact with the surrounding reinforcement ring. The friction forces activated in this manner provide for a counter force which retards the rotation of the shaft so that excessive speeds of the asynchronous motor/generator are prevented even if the forced shut down of the gas flow by the SPC should fail.

Because of the compact design of the arrangement according to the invention, wherein the turbine wheel is mounted within the pipe walls onto the shaft so that it is easily accessible, a turbine wheel, which has been damaged by such a braking procedure can be easily replaced.

The advantages and features of the invention will become readily apparent from the following description of preferred embodiments on the basis of the accompanying drawings.

DESCRIPTION OF A PREFERRED EMBODIMENT

Figure 1:
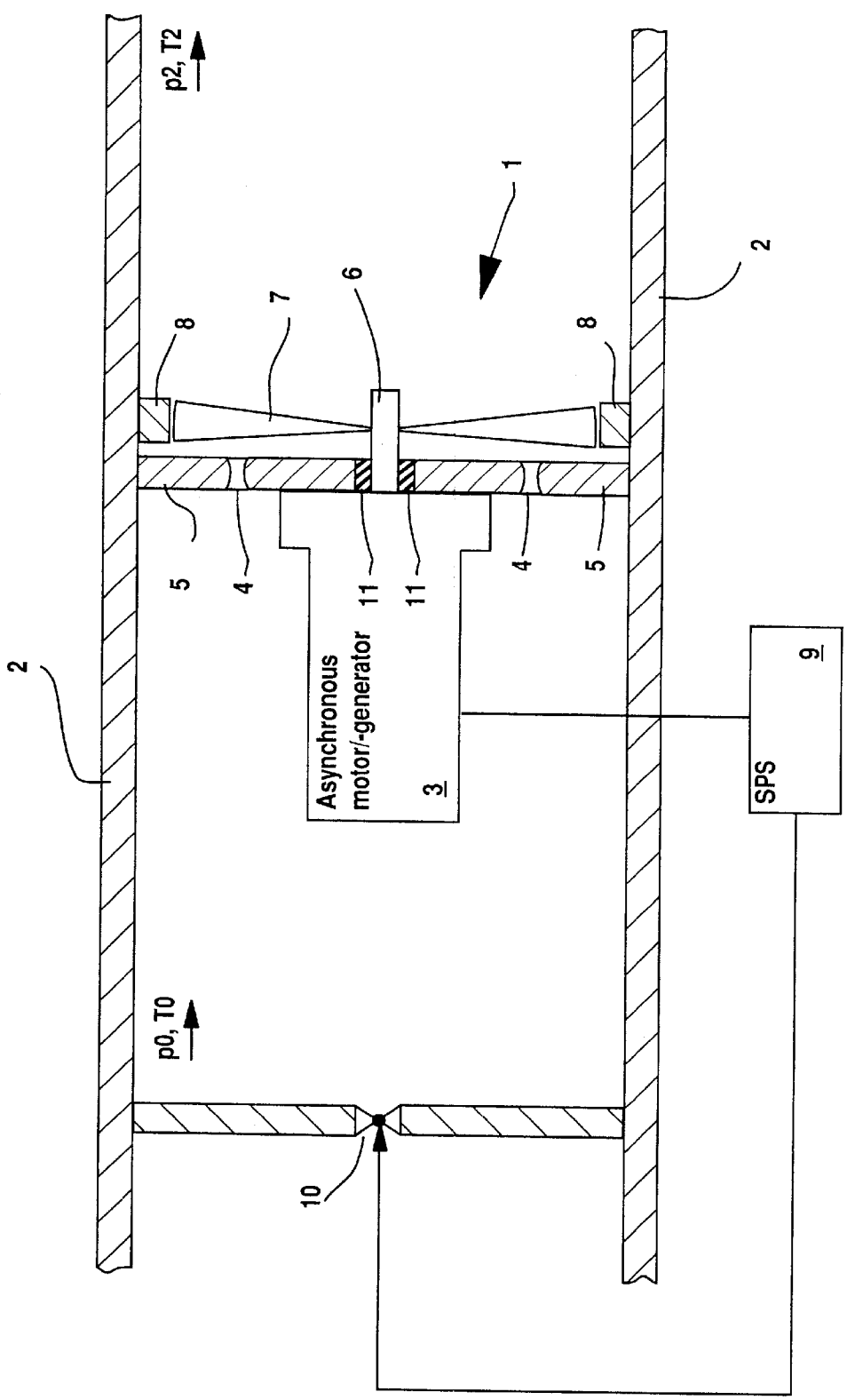
FIG. 1 is a schematic representation of a first embodiment of the arrangement according to the invention for a gas expansion turbine in an installation with a single stage arrangement including a separation wall and a turbine wheel, and in FIG. 2 is a schematic representation showing a second embodiment of the arrangement according to the invention for a gas expansion turbine in an installation of a two-stage arrangement with two separating walls and two turbine wheels.

FIG. 1 shows a gas expansion turbine arrangement 1 disposed in radial direction centrally in a gas supply pipe 2. It includes an asynchronous motor/generator 3, a separating wall 5, which separates the gas pipe line radially and which includes nozzles 4 for the admission of the supply gas and, furthermore, a turbine wheel 7 mounted on the shaft 6 of the asynchronous motor/generator 3 which shaft extends axially within the pipe 2. In this embodiment the asynchronous motor 3 shown in FIG. 1 is mounted on the separating wall 5 so as to be disposed upstream in flow direction of the gas and the free end of the shaft 6 extends through the separating wall.

The asynchronous motor/generator can of course also be disposed downstream of the separating wall and, furthermore, does not need to be mounted on the separating wall.

At the upstream side (on the lift side as shown in FIG. 1), the supply gas has a pressure p0 and a temperature T0; at the downstream side the gas has a pressure of p2 and a temperature of T2. Then the following applies p0>p2 and T0>T2. Because of the pressure drop, the gas is forced through the decompression nozzles 4 in the separating wall 5 and impinges downstream onto the turbine wheel 7 which is mounted onto the shaft 6 of the asynchronous motor 3 and which is driven thereby.

It is known that an asynchronous motor can be operated either as a motor or a generator depending on its slip, which is a measure for the ratio between the mechanical speed of the shaft and the rotational speed of the rotating magnetic field generated in the asynchronous motor.

The asynchronous motor/generator 3 is brought under motor operation up to a speed where generator operation takes over by an external net voltage. This necessary speed is maintained by the gas passing on the outside past the turbine wheel and transferring permanently a part of its energy to the shaft 6. After the startup range, electrical energy can be generated by the asynchronous motor/generator 3 and can be permanently fed into a power net (not shown).

The turbine wheel is preferably of lightweight design and consists of a material of lower density than steel.

Because the temperature T2 of the gas stream is reduced during the decompression step, it is even easily possible to use a plastic material.

In the embodiment shown in FIG. 1, the seal 11 of the shaft 6 does not need to be gas tight with respect to the separating wall 5 since leakage flows affect the efficiency of the complete system only negligibly.

The asynchronous motor/generator 3 is in communication with a programmable memory control unit 9, which controls the speed of the asynchronous motor. If, because of variations in the gas flow or for other reasons (for example breakdown of the net), the speed of the asynchronous motor increases undesirably beyond a critical threshold, the control unit 9 initiates a safety valve 10 arranged upstream of the asynchronous motor/generator 3 to partially or completely interrupt the gas flow.

As additional safety measure against high speeds of the asynchronous motor 3, the gas supply pipe may include in the area of the turbine wheel 7 a reinforcement ring 8, wherein the distance between the inside of reinforcement ring 8 and the outer circumference of the turbine wheel 7 is so selected that the turbine wheel can freely rotate within the reinforcement ring 8 at speeds below a predetermined threshold speed, but that, upon exceeding the predetermined speed threshold value, the turbine wheel comes into contact with the reinforcement ring because of a radial stretching of the blades resulting from the centrifugal forces. By friction of the turbine wheel blades with the reinforcement ring, the turbine wheel is then slowed down.

It has been found in praxis that generally neither the asynchronous motor/generator, nor its shaft are damaged by such an emergency braking procedure, but only the blade tips of the turbine wheel which consists for example of plastic sliding along the reinforcement ring may be ground down slightly. Because of the simple arrangement according to the invention for a decompression turbine, however, it is easily possible, after such an emergency braking procedure, to replace the turbine wheel which is easily accessible in the interior of the gas supply pipe if this should be necessary. It has further been found in praxis that the arrangement according to the invention can easily survive several such emergency braking procedures so that, after an emergency braking procedure, the turbine wheel does not necessarily have to be replaced, but that such replacements can be performed during periodic maintenance work.

Figure 2:
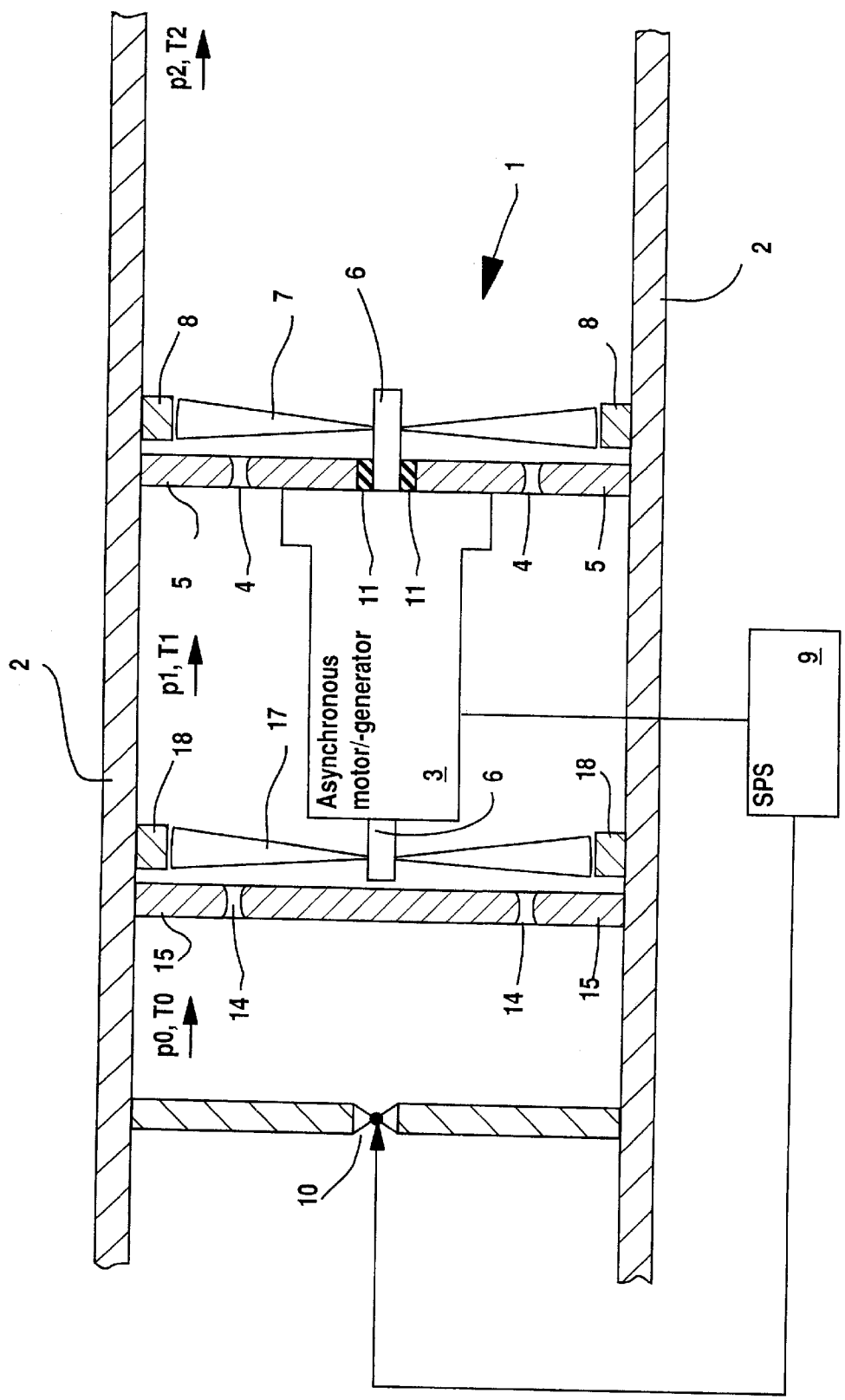

FIG. 2 shows, in a representation corresponding to that of FIG. 1, a second embodiment of a gas decompression turbine arrangement according to the invention in a two stage design. In this case, the gas pipe 2 includes an asynchronous motor 3 disposed between a first separating wall 15 provided with decompression nozzles 14 and a second separation wall 5 provided with decompression nozzles 4. Downstream of the first separation wall 14, the shaft 6 carries a second turbine wheel 17. The shaft 6 is supported in (not necessarily gas-tight) seals 1 disposed in the second separating wall 5. Furthermore, optionally, a second reinforcement ring 18 may be disposed around the second turbine wheel 17. Otherwise, the arrangement is as already described with reference to FIG. 1.

In the nozzles 14 formed in the first separating wall 15, the supply gas is decompressed in a first decompression stage from the temperature $T_0$ and the pressure $p_0$ to the temperature $T_1$ and the pressure $p_1$ and in the nozzles 4 of the second separation wall 5, the supply gas is decompressed in a second decompression stage from the temperature $T_1$ and the pressure $p_1$ to the temperature $T_2$ and the pressure $p_2$.

Because of the well-known sturdiness and reliability of asynchronous motors or respectively, generators and the simple and compact design, a decompression gas turbine arrangement according to the invention has a long life with little maintenance requirements. It operates reliably, but can be safely shut down when necessary. Even with a relatively low remuneration for the electrical energy fed to the external net during generator operation, the investment costs will be amortized over the lifetime of the arrangement many times over.

What is claimed is:

1. An arrangement of a gas decompression turbine in a gas supply piping system, said piping system including a pipe section consisting of a single gas supply pipe, a radial separation wall extending across said single gas supply pipe, a gas decompression turbine and an asynchronous motor/generator unit disposed in said single gas supply pipe, said asynchronous motor/generator unit having a shaft with a lightweight impeller wheel disposed in said single gas supply pipe, a separation wall disposed within said pipe section upstream of, and adjacent to, said gas decompression turbine, said separation wall including at least one nozzle for decompressing the gas and directing the gas being decompressed onto said impeller wheel for driving said asynchronous motor/generator unit, means for conducting away electrical energy produced during generator operation of said motor/generator unit and feeding it into an energy supply network, a safety valve arranged upstream of said asynchronous motor/generator unit for controlling the gas flow to said pipe section, and a control unit connected to said asynchronous motor/generator unit for controlling said valve so as to limit the gas supply to said pipe section when said asynchronous motor/generator shaft exceeds a critical speed value.

2. An arrangement according to claim 1, wherein a reinforcement ring is disposed at the inner circumference of the gas supply line at the level of the at least one turbine wheel wherein the distance between the inside of the reinforcement ring and the outer circumference of the bladed turbine wheel is so selected that the turbine wheel is freely rotatable within the reinforcement ring at speeds below a predetermined speed value, but the bladed turbine wheel comes into contact with the reinforcement ring as a result of the radial stretching of the blades caused by centrifugal forces when the predetermined speed value is exceeded.

3. An arrangement according to claim 1, wherein said at least one bladed turbine wheel consists of plastic or a light metal.

\* \* \* \* \*